United States Patent [19]

Smith

[11] Patent Number: 4,581,420

[45] Date of Patent: Apr. 8, 1986

[54] COPOLYETHERESTER-HEXAHYDROPH-THALATE ESTER-BLOCK COPOLYMERS

[75] Inventor: Gary F. Smith, Pittsfield, Mass.

[73] Assignee: General Electric Company, Pittsfield, Mass.

[21] Appl. No.: 685,278

[22] Filed: Dec. 24, 1984

[51] Int. Cl.$^4$ .................... C08F 283/00; C08G 63/76; C08L 67/00

[52] U.S. Cl. .................... 525/437; 525/444; 525/448; 528/301; 528/302

[58] Field of Search ............... 528/301, 302; 525/437, 525/444, 448

[56] References Cited

U.S. PATENT DOCUMENTS

| | | | |
|---|---|---|---|
| 3,651,014 | 3/1972 | Witsiepe | 260/75 R |
| 3,725,352 | 4/1973 | Koleske et al. | 260/75 R |
| 3,763,109 | 10/1973 | Witsiepe | 260/75 R |
| 3,766,146 | 10/1973 | Witsiepe | 260/75 R |
| 3,784,520 | 1/1974 | Hoeschele | 260/75 R |
| 3,801,547 | 4/1974 | Hoeschele | 260/75 M |
| 3,944,516 | 3/1976 | Petke | 260/40 R |
| 4,093,675 | 6/1978 | Schure et al. | 525/437 |
| 4,129,607 | 12/1978 | Kooi et al. | 525/438 |
| 4,156,702 | 5/1979 | Edinger | 525/166 X |
| 4,211,689 | 7/1980 | Borman | 260/40 R |
| 4,247,427 | 1/1981 | Edinger | 525/437 X |
| 4,250,280 | 2/1981 | Tanaka et al. | 525/437 |
| 4,264,761 | 4/1981 | McGirk | 528/300 |

*Primary Examiner*—Lucille M. Phynes
*Attorney, Agent, or Firm*—Edward K. Welch, II; William F. Mufatti; John W. Harbour

[57] ABSTRACT

Improved copolyether ester elastomers having excellent melt and crystallization temperatures as well as improved compression set as compared to prior art copolyetheresters are prepared by incorporating therein hexahydrophthalic ester polymer blocks.

21 Claims, No Drawings

COPOLYETHERESTER-HEXAHYDROPHTHALATE ESTER-BLOCK COPOLYMERS

The present invention relates to elastomeric thermoplastic block copolymers derived from polyester blocks, poly(alkylene ether) blocks and hexahydrophthalate ester blocks having greatly improved compression set and melting and crystallization characteristics as compared to random copolyetheresters having incorporated therein hexahydrophthalic acid.

It is known to prepare block copolymers comprised of poly(butylene terephthalate)blocks and poly(butylene hexahydrophthalate)blocks (see U.S. Pat. No. 4,211,689). While these compositions have excellent physical properties as compared to poly(butylene terephthalate) homopolymer, they are of very high modulus and, thus, are inappropriate for applications requiring low modulus or elastomeric characteristics.

Copolyetherester elastomers are well known. Generally, they are prepared by conventional esterification/condensation processes for the preparation of polyesters from diols, dicarboxylic acids and poly(alkylene ether) glycols of molecular weight of from 350-6000. Such copolyetheresters and their methods of production are described in, for example, U.S. Pat. Nos. 3,023,123; 3,763,109; 3,651,014; 3,766,146 and 3,663,653 and are commercially available from a number of sources commercially including E. I. duPont under the trademark Hytrel.

Additionally, it is known to make copolyetherester elastomers, such as described above, wherein some of the dicarboxylic acid and/or poly(alkylene ether)glycol is substituted by hexahydrophthalic acid. For example, Petke (U.S. Pat. No. 3,944,576) describes a hot-melt adhesive composition comprising an admixture of a polystyrene and a random copolyesters derived from terephthalic acid, hexahydroterephthalic acid, butanediol and poly(tetramethylene ether)glycol. Finally, McGirk (U.S. Pat. No. 4,264,761) describes random copolyetheresters suitable as barrier coats having incorporated therein hexahydrophthalic acid.

While the foregoing hexahydrophthalate modified copolyetheresters have good elastomeric properties, their use may be somewhat limited by their low crystallization and melt temperatures and average compression set properties as compared to unmodified copolyetheresters. Alternatively, while the unmodified copolyetheresters have the good melt and crystallization properties, certain elastomeric properties as well as stability characteristics are not as good as with the hexahydrophthalate modified compositions.

It is an object of the present invention to provide thermoplastic elastomeric compositions having excellent crystallization and melt temperatures and characteristics as well as superior elastomeric properties including compression set and Bayshore Resiliency as compared to either hexahydrophthalate modified or unmodified random copolyetheresters.

SUMMARY OF THE INVENTION

The improved thermoplastic elastomeric block copolymers of the present invention may be prepared by conventional esterification/transesterification processes from (a) an aromatic polyester, (b) a poly(alkylene ether)glycol having a molecular weight of from about 350 to about 12000, and (c) a property improving amount of a long chain cycloaliphatic polyester based on hexahydrophthalic acid. The aromatic polyester (a) may be prepared in a separate step prior to polymerization or it can be prepared during the polymerization. Similarly, any combination of the reactants (a), (b) or (c) may be prereacted in a separate prepolymerization step prior to final polymerization of the polymers of the present invention.

In general, the block copolymers of the present invention comprise from about 40 to about 90, preferably from about 60 to about 80, parts by weight aromatic polyester units derived from one or more aromatic polyesters (a); from about 5 to about 60, preferably from about 15 to about 40, parts by weight poly(alkylene ether)units derived from at least one poly(alkylene ether)glycol (b) and from about 2 to about 50, preferably from about 5 to about 25 parts by weight hexahydrophthalate ester polymer units derived from at least one hexahydrophthalate ester polymer. These compositions may contain and preferably do contain stabilizers and the like.

DETAILED DESCRIPTION

The aromatic polyesters (a) are prepared by conventional esterification processes from (i) one or more diols and (ii) one or more aromatic dicarboxylic acids.

Diols which are suitable for use in preparing the aromatic polyester blocks are saturated and/or unsaturated aliphatic, cycloaliphatic, and aromatic dihydroxy compounds. They will preferably have a molecular weight of about 300 or less. Preferred are diols with 2-20 carbon atoms such as ethylene, propylene, tetramethylene, pentamethylene, 2-methyl trimethylene, 2,2-dimethyltrimethylene, hexamethylene and decamethylene glycols; dihydroxy cyclohexane; cyclohexane dimethanol; resorcinol; hydroquinone; 1,5-dihydroxy naphthalene; 2-octyl undercane diol or mixtures of any one or more of these diols with unsaturated diols such as butene-diol, hexene-diol, etc. Especially preferred are saturated aliphatic diols, mixtures thereof or a mixture of a saturated diol(s) with an unsaturated diol(s), each diol containing 2-8 carbon atoms. Included among the aromatic dihydroxy compounds which can be used are 4,4' dihydroxy diphenyl, bis(p-hydroxyphenyl)methane, and 2,2-bis(p-hydroxyphenyl)propane. Equivalent ester-forming derivatives of diols are also useful (e.g., ethylene oxide or ethylene carbonate can be used in place of ethylene glycol).

Where more than one diol is employed, it is preferred that at least about 60 mole %, based on the total diol content, be the same diol, most preferably at least 80 mole %. The preferred polyesters are those in which 1,4- butanediol is present in a predominant amount, most preferably when 1,4-butanediol is the only diol.

Dicarboxylic acids suitable for use in preparing the polyester block are the $C_6$ to $_{20}$ aromatic dicarboxylic acids, the esters thereof and the equivalent ester-forming derivatives thereof, including for example the acid halides and anhydrides, provided the number of carbons refers only to the acid itself.

As the term is used herein, aromatic dicarboxylic acids are dicarboxylic acids having two carboxyl groups attached to a carbon atom in an isolated or fused benzene ring system. It is not necessary that both functional carboxyl groups be attached to the same aromatic ring and where more than one ring is present, they can be joined by aliphatic or aromatic divalent radicals or divalent radicals such as —O— or —$SO_2$—. Preferred aromatic dicarboxylic acids include for example terephthalic acid, isophthalic acid, phthalic acid, napthalene-2,6-dicarboxylic acid, napthalene-1,5-dicarboxylic acid, naphthalene-2,7-dicarboxylic acid, oxybis(benzoic acid), 4,4-sulfonyl dibenzoic acid and halo and $C_1$ to $C_{12}$ alkyl, alkoxy and aryl ring substitution derivatives thereof.

Finally, where mixtures of dicarboxylic acids are employed in the preparation of the aromatic polyesters, it is preferred that at least about 60 mole %, preferably at least about 80 mole %, based on 100 mole % of dicarboxylic acid, be of the same dicarboxylic acid or ester derivative thereof. The preferred aromatic polyesters are those in which dimethylterephthalate is the predominant dicarboxylic acid, most preferably when dimethylterephthalate is the only dicarboxylic acid.

Optionally, the aromatic polyesters may contain a minor amount, generally less than 20 mole percent, preferably less than 10 mole percent, based on the dicarboxylic acid(s), of a $C_4$ to $C_{16}$ aliphatic and/or cycloaliphatic dicarboxylic acid. Exemplary of the aliphatic and cycloaliphatic dicarboxylic acid there may be given glutaric acid, adipic acid, azelaic acid, succinic acid, 1,4-cyclohexane dicarboxylic acid, tetramethyl succinic acid and cyclopentane dicarboxylic acid.

These aromatic polyesters (a) may be prepared in a separate step prior to polymerization of the block copolymers of the present invention or the reactants therefore may be directly added to the reaction vessel with the poly(alkylene ether)glycol (b) and hexahydrophthalate ester polymer (c) and polymerized during the overall polymerization process. If a prepolymer or preformed aromatic polyester is to be used, they may be prepared by conventional processes as described in, for example, U.S. Pat. Nos. 2,465,319; 3,047,539 and 2,910,466, herein incorporated by reference. Preferred aromatic polyester prepolymers are those having an intrinsic viscosity of at least about 0.2 dl/g, most preferably at least 0.3 dl/g as measured in a 60:40 phenol/tetrachloroethane mixture. Of course, the invention is also applicable to prepolymers of lower IV as well.

Preferred aromatic polyesters are of the formula:

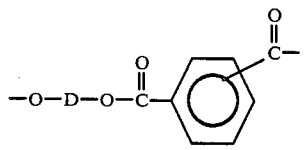

where D is a $C_2$ to $C_8$ organic radical remaining after removal of the terminal hydroxy groups of an aliphatic or cycloaliphatic diol. Especially preferred aromatic polyesters are poly(butylene terephthalate), poly(butylene terephthalate-co-isophthalate) and poly(ethylene terephthalate), most preferably poly(butylene terephthalate).

Poly(alkylene ether)glycols (b) suitable for use in the prepartion of the block copolymer of the present invention will generally have a molecular weight of from about 350 to about 12000, preferably from about 900 to about 4000. Additionally, they will generally have a carbon-to-oxygen ratio of from about 1.8 to about 4.3.

Representative of the long chain poly(alkylene ether)glycols that may be used, there may be given poly(ethylene ether)glycol; poly(propylene ether)glycol; poly(tetramethylene ether)glycol; random or block copolymers of ethylene oxide and propylene oxide, including propylene oxide terminated poly(ethylene ether)glycol; and random or block copolymers of tetrahydrofuran with minor amounts of a second monomer such as ethylene oxide, propylene oxide and methyl tetrahydrofuran. Polyformal glycols prepared by reacting formaldehyde with diols such as 1,4-butanediol and 1,5-pentanediol are also useful. Especially preferred poly(alkylene ether)glycols are poly(propylene ether)glycol, poly(tetramethylene ether)glycol and poly(ethylene ether)glycols end capped with poly(propylene ether)glycol and/or propylene oxide.

While copolyetheresters prepared from the foregoing components have good melting and crystallization characteristics, their elastomeric properties are only fair. Modification thereof by substituting hexahydrophthalic acid for some of the dicarboxylic acid and/or poly(alkylene ester) results in random copolyetheresters having good elastomeric properties but poorer melt and crystallization temperatures and characteristics. Applicant has now surprisingly found that a hexahydrophthalate ester polymer when incorporated as a block segment in a copolyetherester block-copolymer manifests unexpectedly improved melt and crystallization temperatures and characteristics as well as unexpectedly and markedly improved elastomeric properties including compression set, Ross Flex Fatique, Bayshore Resilience, and/or Shore D hardness. In general, these compositions have excellent molding characteristics and stress-strain elastomeric properties.

The hexahydrophthalic ester polymers (d) suitable for providing the unexpectedly improved properties of the present invention are the esterification/polycondensation reaction product of one or more diols and a hexahydrophthalic acid. Diols suitable for the preparation of the hexahydrophthalate ester polymer block are as described above for the preparation of the aromatic polyester (a). Preferred diols are the saturated and unsaturated aliphatic diols including for example 1,4-butanediol; 1,6-hexanediol; and 1,4-butenediol.

Further, while hexahydrophthalic acid is preferred, it is also within the scope of the present invention to prepare the hexahydrophthalate ester polymers from substituted hexahydrophthalic acids, the ester equivalents of either or the anhydride derivatives of either. Exemplary of these there may be given, for example, dimethyl hexahydrophthalate, 4-methyl-1,2-cyclohexanedicarboxylic acid and hexahydrophthalic anhydride.

These hexahydrophthalate based prepolymers may be prepared by conventional esterification processes such as mentioned above for aromatic polyesters (a). In general, it is preferred that the degree of polymerization of the hexahydrophthalate based prepolymer be such as to provide a prepolymer having a Brookfield viscosity of at least about 10,000 centipoise, preferably at least about 20,000 centipoise, as measured at 60° C. with a No. 6 spindle. Of course it is anticipated that lower viscosity polyesters will be useful herein and are thus intended within the full scope of the present invention.

The block copolymers of the present invention will generally comprise from about 40 to about 90 parts by weight of the aromatic polyester blocks (a), from about 5 to about 60 parts by weight of long chain poly(alkylene ether) blocks (b) and from about 2 to about 30 parts by weight of hexahydrophthalate ester polymer blocks (c). Preferred compositions will comprise from about 60 to about 80 parts by weight of (a), from about 15 to about 40 parts by weight of (b) and from about 5 to about 15 parts by weight of (c).

The block copolymers described herein may be made conveniently by conventional ester interchange reactions. Exemplary of the processes that may be used are as set forth in, for example, U.S. Pat. Nos. 3,023,192; 3,763,109; 3,663,653 and 3,801,547, herein incorporated by reference, as well as those already referred to above. Typically, the aromatic polyester (a), long chain poly(alkylene ether)glycol (b) and the hexahydrophthalate ester polymer (c) are heated to about 150° C. to 260° C. at about atmospheric pressure while distilling off volatiles. Depending upon temperature, catalyst, excess diol, and degree of hydroxy end capping of the aromatic polyester (a), this stage of polymerization is complete within a few minutes to a few hours. This procedure results in the preparation of a low intrinsic viscosity copolymer which can be carried to a high molecular weight (high intrinsic viscosity, e.g. greater than about 0.6, preferably greater than about 0.8) copolyester by polycondensation. During polycondensation, excess diol in the system as well as diol end caps on the low molecular weight prepolymer are distilled off. Additional ester interchange occurs during this distillation to increase the molecular weight of the polymer and to randomize the arrangement of the individual block units. During polycondensation, the temperatures of the reaction system is elevated to between about 240° C. and 300° C. and the pressure decreased to less than about 670 Pa, more preferably less than about 250 Pa.

Alternatively, as mentioned above, the reactants for the aromatic polyester (a) may be charged to the system along with the long chain poly(alkylene ether)glycol (b) and hexahydrophthalate ester polymer (c). In this instance, the long chain poly(alkylene ether)glycol and hexahydrophthalate ester polymer together with the dicarboxylic acid(s) or methylester(s) thereof and a molar excess, as compared to the acid, of the diol(s) are charged into the reaction vessel and heated at 150° to 260° C. Heating is continued until methanol and/or water evolution is substantially complete. Again depending upon temperature, catalyst and diol excess, this polymerization is complete within a few minutes to a few hours. The prepolymer as produced is then carried to a high molecular weight copolymer by polycondensation as described above.

While not required, it is customary and preferred to utilize a catalyst or catalyst system in the process for the production of the block copolyesters of the present invention, as well as for the preparation of the aromatic polyester (a) and hexahydrophthalate ester polymer (c) preformed blocks. In general, any of the known ester-interchange and polycondensation catalysts may be used. Although two separate catalysts or catalyst systems may be used, one for ester interchange and one for polycondensation, it is preferred, where appropriate, to use one catalyst or catalyst system for both. In those instances where two separate catalysts are used, it is preferred and advantageous to render the ester-interchange catalyst ineffective following the completion of the precondensation reaction by means of known catalyst inhibitors or quenchers, in particular, phosphorus compounds such as phosphoric acid, phosphenic acid, phosphonic acid and the alkyl or aryl esters or salts thereof, in order to increase the thermal stability of the resultant polymer.

Exemplary of the suitable known catalysts there may be given the acetates, carboxylates, hydroxides, oxides, alcoholates or organic complex compounds of zinc, manganese, antimony, cobalt, lead, calcium and the alkali metals insofar as these compounds are soluble in the reaction mixture. Specific examples include, zinc acetate, calcium acetate and combinations thereof with antimony tri-oxide and the like. These catalysts as well as additional useful catalysts are described in U.S. Pat. Nos. 2,465,319; 2,534,028; 2,850,483; 2,892,815; 2,937,160; 2,998,412; 3,047,539; 3,110,693 and 3,385,830, among others, incorporated herein by reference.

Where the reactants and reactions allow, it is preferred to use the titanium catalysts including the inorganic and organic titanium containing catalysts, such as those described in, for example, U.S. Pat. Nos. 2,720,502; 2,727,881; 2,729,619; 2,822,348; 2,906,737; 3,047,515; 3,056,817; 3,056,818; and 3,075,952 among others, incorporated herein by reference. Especially preferred are the organic titanates such as tetra-butyl titanate, tetra-isopropyl titanate and tetra-octyl titanate and the complex titanates derived from alkali or alkaline earth metal alkoxides and titanate esters, most preferably the organic titanates. These too may be used alone or in combination with other catalysts such as for example, zinc acetate, calcium acetate, manganese acetate or antimony trioxide, and/or with a catalyst quencher as described above. The catalyst should be used in amounts of from about 0.005 to about 2.0 percent by weight based on the total reactants.

Both batch and continuous methods can be used for any stage of the block copolyester polymer preparation. Polycondensation of prepolymer can also be accomplished in the solid phase by heating finely divided solid prepolymer in a vacuum or in a stream of inert gas to remove liberated low molecular weight diol. This method has the advantage of reducing degradation because it must be used at temperatures below the softening point of the prepolymer. The major disadvantage is the long time required to reach a given degree of polymerization.

Although the copolyesters of this invention possess good resistance toward heat aging and photodegradation, it is advisable to stabilize these compositions by incorporating antioxidants in the copolyester compositions.

Most any oxidative and/or thermal stabilizer known in the art for copolyetheresters may be used in the practice of the present invention. These can be incorporated into the compositions either during polymerization or while in a hot melt stage following polymerization. Satisfactory stabilizers include the phenols and their derivatives, amines and their derivatives, compounds containing both hydroxyl and amine groups, hydroxyazines, oximes, polymeric phenolic esters and salts of multivalent metals in which the metal is in its lower valence state.

Representative phenol derivatives useful as stabilizers include 3,5-di-tert-butyl-4-hydroxy hydrocinnamic triester with 1,3,5-tris-(2-hydroxyethyl)-s-triazine-2,4,6-(1H,3H,5H)trione (Goodrite 3125); N,N'-hexamethylene-bis(3,5-di-tert-butyl-4-hydroxyhydrocinnamamide); 4,4'-bis(2,6-ditertiarybutylphenol); 1,3,5-trimethyl-2,4,6-tris(3,5-ditertiary-butyl-4-hydroxybenzyl)benzene and 4,4'-butylidene-bis(6-tertiary-butyl-m-cresol). Various inorganic metal salts or hydroxides can be used as well as organic complexes such as nickel dibutyl dithiocarbonate, manganous salicylate and copper 3-phenyl-salicylate. Typical amine stabilizers include 4,4-bis($\alpha$, $\alpha$-dimethylbenzyl) diphenylamine, N,N'-bis(-betanaphthyl)-p-phenylene diamine; N,N'-bis(1-methylheptyl) -p-phenylene diamine and either phenylbetanaphthyl amine or its reaction products with aldehydes. Mixtures of hindered phenols with esters of thiodipropionic acid, mercaptides and phosphite esters are particularly useful. Additional stabilization to ultraviolet light can be obtained by compounding with various UV absorbers such as substituted benzophenones and/or benzotriazoles.

Further, the properties of these polyesters can be modified by incorporation of various conventional inorganic fillers such as carbon black, silica gel, alumina, clays and chopped fiberglass. These may be incorporated in amounts up to 50% by weight, preferably up to about 30% by weight. In general, these additives have the effect of increasing the modulus of the material at various elongations.

DETAILED DESCRIPTION OF THE PREFERRED EMBODIMENTS

The following examples are presented as illustrative of the present invention and are not to be construed as limiting thereof.

The following procedures were used for testing physical properties:

| Shore D Hardness | ASTM 2240 |
| Compression Set | ASTM 395B |
| Ross flex fatique | ASTM 1052 |

The compositions of the present invention were prepared by way of both one pot and two pot reactions. In the former, just the hexahydrophthalate ester polymer was preformed. In the latter both the aromatic polyester and the hexahydrophthalate ester polymer were preformed. In general the reactions were run as follows:

One Pot

In the one pot reaction hexahydrophthalic anhydride and the respective diol were added to the reaction and heated under nitrogen gas in the presence of a titanate ester catalyst. Volatiles and water are removed from the reaction mix as the temperature is increased from 165° C. to 250° C. over a period of about one hour. Vacuum is slowly applied and maintained at about 1 mmHg for a period of several hours during which time excess diol is removed. Vacuum was broken with nitrogen gas and then dimethylterephthalate, butanediol and poly(tetramethylene ether)glycol and catalysts were added to the formed hexahydrophthalic ester prepolymer. Once again the system was subjected to a vacuum and heated from 165° C. to 250° C. The reaction was maintained at about 250° C. at a pressure of about 0.5 mmHg for about 3.5 hours to produce the block copolymer.

Two Pot

In the two pot reaction the hexahydrophthalate prepolymer and poly(butylene terephthalate) prepolymer were each prepared in a separate reactor in accordance with the procedure for the preparation of the hexahydrophthalate prepolymer. Once both prepolymers were formed, the hexahydrophthalate prepolymer and poly(tetramethylene ether)glycol were added to the aromatic polyester prepolymer together with a tin catalyst. The pressure of the reactor was then reduced to about 0.5 mmHg and the temperature raised to and held at 250° C. for about 3.5 hours to produce the block copolymer.

COMPARATIVE EXAMPLES

All comparative examples were prepared in a one pot synthesis except that all monomers were initially charged into the reactor together. The reaction then progressed as described above except that the reaction proceeded directly from esterification to polycondensation without interruption.

EXAMPLES 1-6, COMPARATIVE EXAMPLES A-C

The following examples are demonstrative of block copolymers of the present invention prepared by way of the two pot reaction. Comparative examples are also presented so as to show the improvement in physical properties and characteristics of the copolymers of the present invention. The composition of each and the properties thereof were as shown in Table 1. In each of the comparative examples, the amount by which the hexahydrophthalic anhydride and diol were added to the reactor was equivalent to that amount necessary to prepare the amount of preformed hexahydrophthalate ester polymer.

TABLE 1

| Example | 1 | A | 2 | B | 3 | C | 4 | 5 | 6 |
|---|---|---|---|---|---|---|---|---|---|
| PBT[a] | 60 | 60 | 60 | 65 | 60 | 60 | 60 | 60 | 60 |
| PMEG 1[b] | 10 | 10 | 30 | 35 | 30 | 30 | | | |
| PHHP[c] | | | | | 10 | 10 | 15 | 15 | 15 |
| PBHP[d] | 30 | 30 | 10 | | | | | | |
| PMEG 2[e] | | | | | | | 30 | 35 | 40 |
| Shore D | 60 | | 55 | 55 | 50 | | 46 | 43 | 42 |
| Bayshore Resilience | 36 | | 47 | 45 | 55 | | 43 | 45 | 45 |
| Compression Set | | | | | | | | | |
| @ 25° C. | | | 39 | 45 | 38 | | | | |
| @ 70° C. | | | 60 | 75 | 61 | | | | |
| Tensile Elongation, % | 350 | | 400 | | 350 | | | | |
| Melt Temperature °C. | 188 | 156 | 184 | 206 | 184 | 160 | 190 | 182 | 175 |

[a]poly(butylene terephthalate) prepolymer
[b]poly(tetramethylene ether)glycol MW 1000
[c]poly(hexamethylene hexahydrophthalate) prepolymer
[d]poly(butylene hexahyrophthalate) prepolymer
[e]poly(tetramethylene ether)glycol MW 2000

The results shown in Table 1 clearly demonstrate the improved melt temperatures and elastomeric properties of the block copolymers of the present invention as compared to similar modified and unmodified random copolyetheresters. Specifically, comparison of Examples 1 and 2 with Comparative Examples A and C, respectively, demonstrates the dramatic increase in melt temperature in the block copolymers of the present invention. Additionally, comparison of Examples 2 and 3 with Comparative Example B clearly shows the improvement of the elastomeric properties of the modified block copolyetheresters of the present invention versus the prior art unmodified random copolyetheresters. This improvement is most marked with respect to the compression sets.

Examples 4–6 are demonstrative of various compositions within the scope of the invention wherein the weight ratio of the block units is varied. As is evident, with increased poly(tetramethylene ether)glycol content, melt temperature decreases; with a concommittant increase in Bayshore resiliency.

EXAMPLE 7, COMPARATIVE EXAMPLE D

Example 7 demonstrates a composition of the present invention prepared by the one pot synthesis. The compositional make up of this composition as well as the physical properties thereof are set forth in Table 2. Comparative Example D is the same as Comparative Example C above.

A review of the examples in Table 2 once again demonstrates the improved melt temperature and thus melt characterisitcs of the block copolymers of the present invention as compared to random copolyesters. The composition of the present invention also had excellent elastomeric and stress-strain properties, particularly with respect to Bayshore resilience and Shore D hardness.

TABLE 2

| Example | 7 | D |
|---|---|---|
| PBT$^a$ | 60 | 60 |
| PMEG 1$^b$ | 30 | 30 |
| PHHP$^c$ | 10 | 10 |
| Shore D | 45 | |
| Bayshore Resilience | 49 | |
| Tm | 178 | 160 |

$^a$charged into the reactor as monomer
$^b$poly(tetramethylene ether)glycol-MW 1000
$^c$poly(hexamethylene hexahydrophthalate) prepolymer

EXAMPLE 8, COMPARATIVE E

A block copolymer within the scope of the present invention was prepared in accordance with Example 2 above. Similarly, an equivalent random copolymer was also produced. Both samples were tested in the Ross (Pierced) Resistance to Flex Cut Growth test. Test samples were molded (5"×1"×⅛") and the number of cycles to 500% cut growth observed. The block copolymer of the present invention did not fail after more than 6,000,000 cycles whereas the random copolyester failed after only 692,000 cycles. Clearly the composition of the present invention have markedly superior flex life.

EXAMPLES 9–10, COMPARATIVE EXAMPLE F

An additional series of examples were prepared embodying the present invention wherein an unsaturated diol was used in the preparation of the hexahydrophthalate polymer. Specifically, these examples demonstrate both the one and two pot reactions wherein butenediol was employed in the preparation of the hexahydrophthalate polymer block. Examples 9 and 10 were prepared by the two pot and one pot synthesis, respectively. The final makeup of each of the examples were such that each polymer had the equivalent amount of monomers capable of producing a block copolymer having 60 parts poly(butylene terephthalate) blocks, 30 parts poly(tetramethylene ether)glycol blocks and 15 parts poly(butenediol-hexahydrophthalate) blocks. The compression sets of each of these three compositions were as set forth in Table 3. Clearly, the compression sets of the compositions within the scope of the present invention far exceed those of the prior art random copolymers.

TABLE 3

| | Compression Set | |
|---|---|---|
| Example | @ 25° C. | @ 70° C. |
| 9 | 29 | 69 |
| 10 | 29 | 69 |
| F | 40 | 74 |

EXAMPLES 11–14

A final series of examples embodying the present invention were prepared further demonstrating the breadth of the invention. Example 11 was prepared by a two pot synthesis, whereas examples 12–14 were prepared by the one pot synthesis. The final compositional makeup of these compositions and the physical properties thereof were as presented in Table 4.

TABLE 4

| Example | 11 | 12 | 13 | 14 |
|---|---|---|---|---|
| PBT | 60 | 60 | 60 | 60 |
| PMEG 2$^a$ | 30 | 30 | 30 | 30 |
| PB'HP$^b$ | 15 | 15 | | |
| PB'H'P$^c$ | | | 15 | |
| PCHP$^d$ | | | | 15 |
| Shore D | 42 | 44 | 45 | 44 |
| Bayshore Resilience | 42 | 44 | 45 | 43 |
| Tm | 170 | 170 | 169 | 170 |

$^a$poly(tetramethylene ether)glycol-MW 1000
$^b$poly(butenediol-hexahydrophthalate)
$^c$poly(butenediol methyl hexahydrophthalate) prepolymer
$^d$poly(cyclohexanedimethanol hexahydrophthalate) prepolymer Obviously, other modifications will suggest themselves to those skilled in the art in light of the above, detailed description. All such modifications are within the full intended scope of the present invention as defined by the appended claims.

I claim:

1. A thermoplastic elastomeric block copolyether ester comprising the reaction product of
   (a) at least one $C_2$ to $C_{20}$ diol,
   (b) at least one $C_6$ to $C_{20}$ aromatic dicarboxylic acid,
   (c) at least one poly(alkylene ether)glycol having a molecular weight of from about 350 to about 12000 and
   (d) a property improving amount of a hexahydrophthalic ester polymer sufficient to improve compression set.

2. The composition of claim 1 wherein the diol is selected from saturated and unsaturated $C_2$ to $C_{20}$ aliphatic and cycloaliphatic diols and wherein at least 60 mole percent of the diol is the same.

3. The composition of claim 1 wherein the diol is selected from the group consisting of saturated and unsaturated $C_2$ to $C_8$ aliphatic diols and wherein at least 80 mole % of the diol is the same.

4. The composition of claim 3 wherein the diol is 1,4-butanediol.

5. The composition of claim 1 wherein the diol is 1,4-butanediol.

6. The composition of claim 1 wherein the aromatic dicarboxylic acid is a $C_6$ dicarboxylic acid or the $C_8$ ester derivative thereof and at least 60 mole % of the acid is the same.

7. The composition of claim 1 wherein the aromatic dicarboxylic acid is a $C_6$ dicarboxylic acid or the $C_8$ ester derivative thereof and at least 80 mole % of the acid is the same.

8. The composition of claim 7 wherein the aromatic dicarboxylic acid is dimethylterephthalate.

9. The composition of claim 1 wherein the aromatic dicarboxylic acid is dimethylterephthalate.

10. The composition of claim 1 wherein reactants (a) and (b) are prereacted to form a low molecular weight aromatic polyester prior to polymerization of the composition.

11. The composition of claim 10 wherein the preformed low molecular weight aromatic polyester is represented by repeating units of the formula:

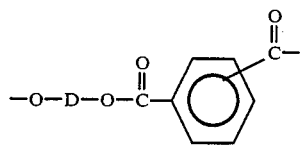

where D is a $C_2$ to $C_8$ organic radical remaining after removal of the terminal hydroxy groups of an aliphatic or cycloaliphatic diol.

12. The composition of claim 11 wherein the preformed low molecular weight aromatic polyester is poly(butylene terephthalate).

13. The composition of claim 1 wherein the poly(alkylene ether)glycol has a molecular weight of from about 900 to about 4000.

14. The composition of claim 13 wherein the poly(alkylene ether)glycol is selected from the group consisting of poly(propylene ether)glycol, poly(tetramethylene ether)glycol and copoly(propylene ether-ethylene ether)glycol.

15. The composition of claim 13 wherein the poly(alkylene ether)glycol is poly(tetramethylene ether)glycol.

16. The composition of claim 1 wherein the hexahydrophthalic ester polymer is derived from a saturated or unsaturated $C_2$ to $C_{20}$ aliphatic or cycloaliphatic diol and a hexahydrophthalic acid.

17. The composition of claim 1 wherein the hexahydrophthalic ester polymer is derived from a $C_2$ to $C_6$ aliphatic diol and a hexahydrophthalic acid.

18. The composition of claim 1 wherein the block copolymer comprises from about 40 to about 90 parts by weight of polyester units derived from (a) and (b), from about 5 to about 60 part by weight of poly(alkylene ether) units derived from (c) and from about 2 to about 30 parts by weight of hexahydrophthalic ester polymer units derived from (d).

19. The composition of claim 1 wherein the block copolymer comprises from about 60 to about 80 parts by weight of polyester units derived from (a) and (b), from about 15 to about 40 parts by weight of poly(alkylene ether) units derived from (c) and from about 5 to about 15 parts by weight of hexahydrophthalic ester polymer units derived from (d).

20. An improved process for the preparation of copolyetherester elastomers which comprises
(A) forming a prepolymer/copolymer mixture by conventional esterification/transesterification reactions from (i) a diol, (ii) an aromatic dicarboxylic acid (iii) a poly(alkylene ether)glycol having a molecular weight of from about 350 to about 12000 and (iv) a preformed polyester derived from a diol and a dicarboxylic acid provided at least one diol and/or dicarboxylic acid is not the same as (i) and (ii), and
(B) polymerizing said prepolymer/copolymer mixture by conventional polycondensation reactions to form a high molecular weight block copolyetherester, wherein the improvement consists of incorporating therein the additional preformed polyester block (iv).

21. An improved process for the preparation of copolyetherester elastomers which comprises preparing a copolyetherester by conventional esterification/polycondensation reactions from
(A) an aromatic polyester prepolymer derived from a diol and an aromatic dicarboxylic acid,
(B) a poly(alkylene ether)glycol having a molecular weight of from about 350 to about 12000, and
(C) a polyester prepolymer derived from a diol and a dicarboxylic acid provided the polyester prepolymer is not the same as the aromatic polyester prepolymer.

* * * * *